(12) United States Patent
Chen et al.

(10) Patent No.: US 7,873,732 B2
(45) Date of Patent: Jan. 18, 2011

(54) MAINTAINING SERVICE RELIABILITY IN A DATA CENTER USING A SERVICE LEVEL OBJECTIVE PROVISIONING MECHANISM

(75) Inventors: Ming Chen, Markham (CA); Michael George Polan, Markham (CA); Alex Kwok Kee Tsui, Markham (CA); Paul Darius Vytas, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1665 days.

(21) Appl. No.: 11/116,827

(22) Filed: Apr. 28, 2005

(65) Prior Publication Data

US 2006/0245411 A1 Nov. 2, 2006

(51) Int. Cl.
*G06F 15/173* (2006.01)
(52) U.S. Cl. .................. 709/226; 709/223; 709/224
(58) Field of Classification Search .................. 709/226
See application file for complete search history.

(56) References Cited

U.S. PATENT DOCUMENTS

| | | | |
|---|---|---|---|
| 6,446,006 B1 * | 9/2002 | Thore | 702/16 |
| 2002/0023126 A1 | 2/2002 | Flavin | 709/203 |
| 2002/0161891 A1 * | 10/2002 | Higuchi et al. | 709/226 |
| 2003/0204621 A1 | 10/2003 | Poletto et al. | 709/239 |
| 2003/0233391 A1 | 12/2003 | Crawford, Jr. et al. | 709/104 |
| 2004/0073673 A1 | 4/2004 | Santos et al. | 709/226 |
| 2004/0243699 A1 * | 12/2004 | Koclanes et al. | 709/225 |
| 2006/0034263 A1 * | 2/2006 | Outhred et al. | 370/352 |
| 2006/0210051 A1 * | 9/2006 | Tomisawa | 379/265.02 |

FOREIGN PATENT DOCUMENTS

JP 2004-94396 3/2004

OTHER PUBLICATIONS

Hamilton et al., "Measuring Reliability of Computation Center Software", Bell Laboratories, ACM Digital Library, 1979, pp. 29-36.
Loman et al., "On Reliability Modeling and Analysis of Highly-Reliable Large Systems", Annual Reliability and Maintainability Symposium. 2002 Proceedings (Cat. No. 02CH37318), pp. 456-159, Published: Piscataway, NJ, USA, 2002.
Knisley, Jr., "Redundancy Provides the Key to Data Center Reliability", Electrical Construction and Maintenance, vol. 99, No. 6, pp. 44-47, Jun. 2000.

* cited by examiner

*Primary Examiner*—Thu Nguyen
*Assistant Examiner*—Neeraj Utreja
(74) *Attorney, Agent, or Firm*—Yee & Associates, P.C.; Jeffrey S. LaBaw

(57) ABSTRACT

There is provided a method, a data processing system and a computer program product for maintaining service reliability in a data center. A probability of breach of a resource in the data center is determined. A breach of a resource may be the failure of the resource, the unavailability of a resource, the underperformance of a resource, or other problems with the resource. If the probability of breach exceeds a predetermined value, then additional resources are made available to the data center in order to prevent a breach of the resource from affecting the performance of the data center.

12 Claims, 3 Drawing Sheets

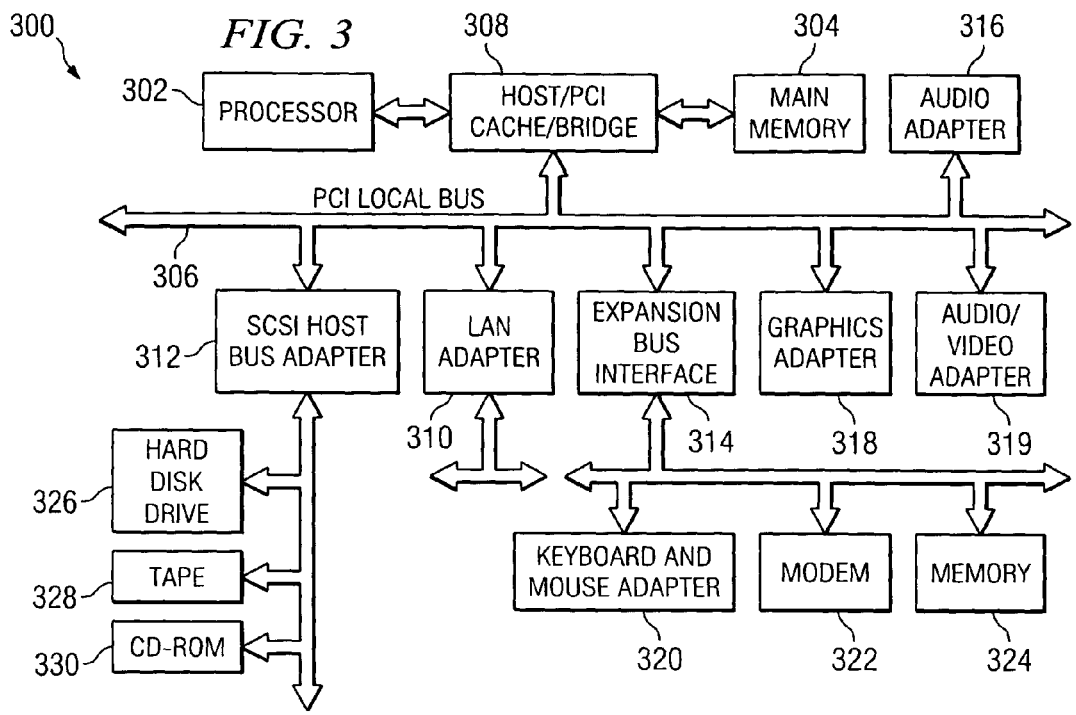
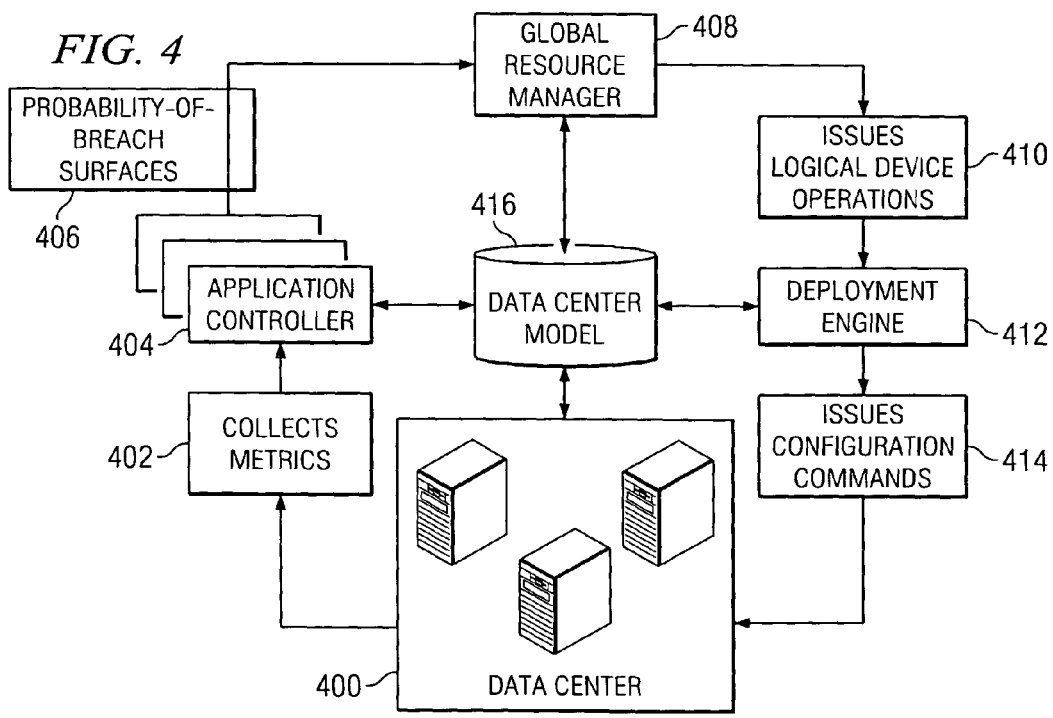

MAINTAINING SERVICE RELIABILITY IN A DATA CENTER USING A SERVICE LEVEL OBJECTIVE PROVISIONING MECHANISM

BACKGROUND OF THE INVENTION

1. Technical Field

The present invention relates generally to an improved data processing system and in particular to a method and apparatus for processing data. Still more particularly, the invention relates to a method, apparatus, and computer program product for maintaining service reliability in a data center using a service level objective provisioning mechanism.

2. Description of Related Art

Modern data centers may contain hundreds if not thousands of resources, such as servers, client computers, software components, printers, routers, and other forms of hardware and software. To save money and operating overhead, a data center operator will generally maintain close to a minimum number of resources needed to operate the data center to a degree desired by the operator. Thus, problems may arise when even one resource fails. For example, the data center may fail to provide service to one or more users or may provide service more slowly.

To solve this problem, a pool of spare resources is maintained. The data center operator may maintain a pool of spare resources, or a third party vendor may provide access to a set of resources on a contract basis. In the latter case, the contract is often referred-to as a service level agreement. If one or more resources fail, perform poorly, or are overloaded, situations are created that may be referred to as a breach, then spare resources are activated, configured, and assigned to the data center as needed.

A problem with this approach is that while the spare resource or resources are being activated and configured, the data center suffers degraded performance or may even be down. Thus, more efficient methods for managing spare resources are desirable.

Because the data center may be very large or complex, automated systems have been designed to monitor the data center and scan for breaches. For example, monitoring agents may be installed on resources in the data center. The monitor agents periodically collect performance data, such as resource utilization or resource failure status, and send the performance data to a data center automation system. An example of a data center automation system is Tivoli Intelligent Orchestrator®, provided by International Business Machines Corporation™. The data center automation system analyzes the performance data for each resource in the data center. The system aggregates the data and uses performance objectives specified in the service level agreement to make recommendations regarding balancing resources in the data center.

However, prior methods for managing a data center may fail if a server or other critical resource in the data center is down. In this case, it may not be possible to use performance data to measure the reliability of a cluster in the data center. For example, a data center has two servers serving an application. The first server is the main server and the second server is a backup server. When the main server is down, the backup server is used to replace the main server.

In this case, CPU (central processing unit) utilization is the same after the backup server takes over, because usually the backup and the main servers have about the same capabilities. For purposes of this example, CPU utilization is the primary measure of reliability in the data center. Thus, the automated data system manager may not evaluate the risk associated with not having a second backup system available in case the first backup system fails.

In addition, making automatic decisions for provisioning resources between multiple applications in a data center can be difficult when different disciplines, such as performance, availability, and fault management, are monitored and wherein a variety of monitoring systems are used. The complexity of the data center and of a monitoring scheme can make provisioning resources a difficult task. Accordingly, it would be advantageous to have an improved method, apparatus, and computer instructions for automatically maintain service reliability in a data center even when detecting a risk of breach is difficult.

SUMMARY OF THE INVENTION

Embodiments of the present invention provide a method, apparatus, and computer program product for maintaining service reliability in a data center. A probability of breach of a resource in the data center is determined. A breach of a resource may be the failure of the resource, the unavailability of a resource, the underperformance of a resource, or other problems with the resource. If the probability of breach exceeds a predetermined value, then additional resources are made available to the data center in order to prevent a breach of the resource from affecting the performance of the data center.

BRIEF DESCRIPTION OF THE DRAWINGS

The novel features believed characteristic of embodiments of the invention are set forth in the appended claims. An embodiment of the invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which an embodiment of the present invention may be implemented.

FIG. 4 is a block diagram illustrating a system for maintaining service reliability in a data center, in accordance with an embodiment of the present invention.

DETAILED DESCRIPTION

Figure 1:
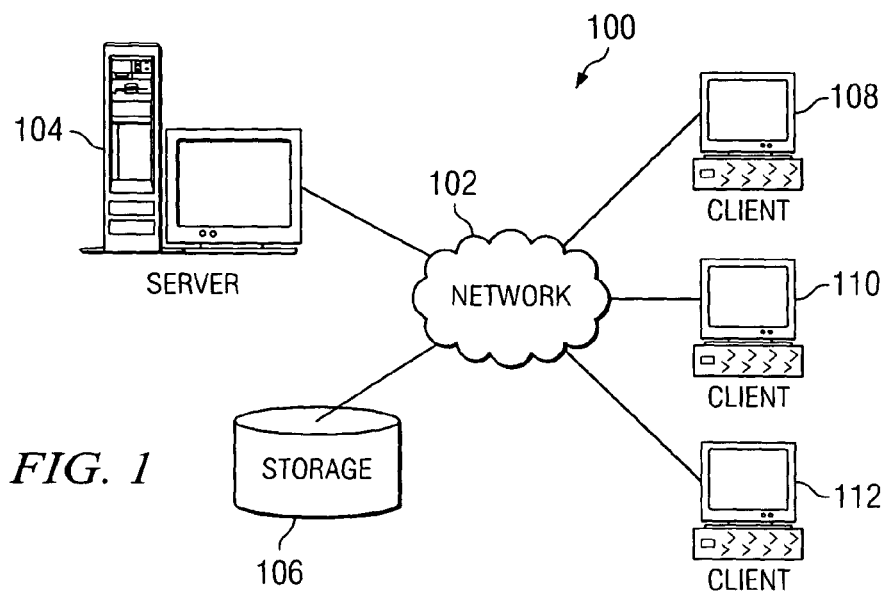
FIG. 1 is a pictorial representation of a network of data processing systems in which an embodiment of the present invention may be implemented.

With reference now to the figures, FIG. 1 depicts a pictorial representation of a network of data processing systems in which an embodiment of the present invention may be implemented. Network data processing system 100 is a network of computers in which an embodiment of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for embodiments of the present invention.

Figure 2:
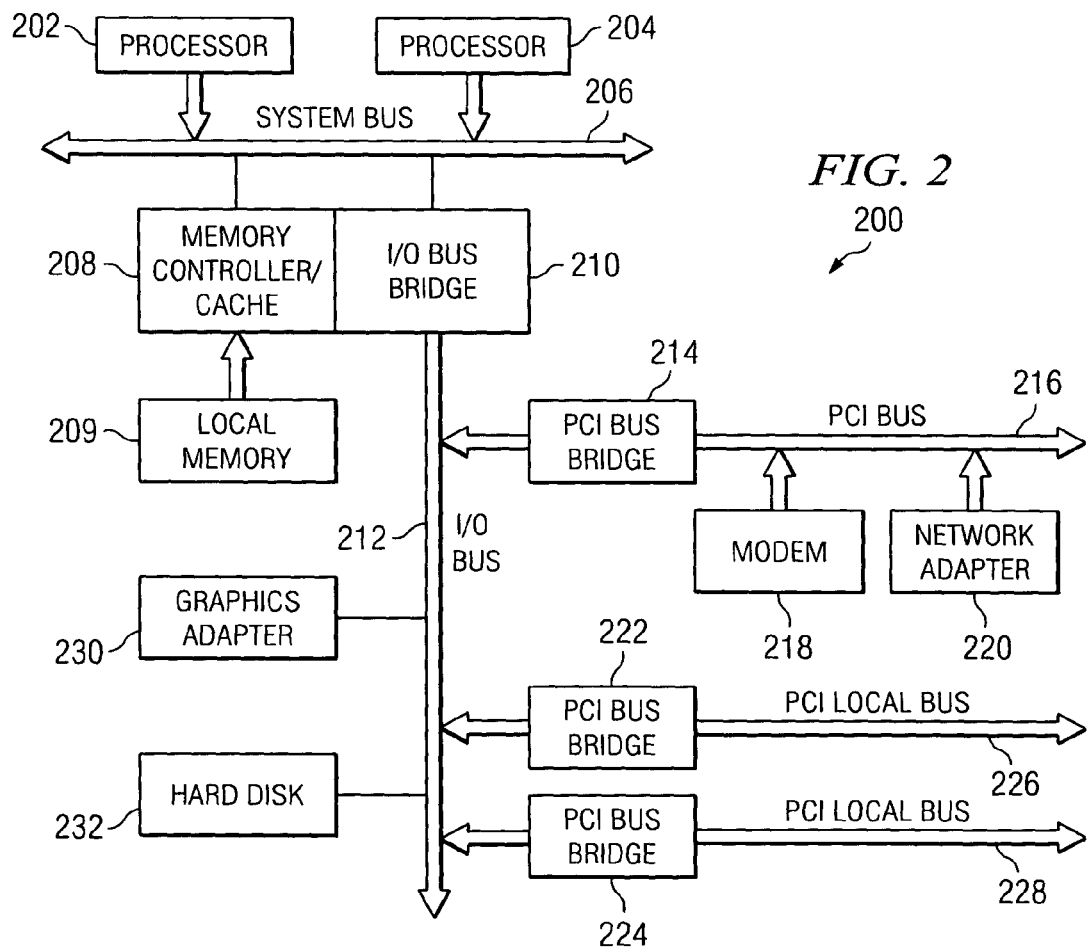
FIG. 2 is a block diagram of a data processing system that may be implemented as a server in which an embodiment of the present invention may be implemented.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to embodiments of the present invention.

The data processing system depicted in FIG. 2 may be, for example, an IBM eServer® pseries® system, a product of International Business Machines Corporation™ in Armonk, N.Y., running the Advanced Interactive Executive (AIX™) operating system or LINUX® operating system.

With reference now to FIG. 3, a block diagram illustrating a data processing system is depicted in which an embodiment of the present invention may be implemented. Data processing system 200 is an example of a client computer. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 200 in FIG. 3. The operating system may be a commercially available operating system, such as WINDOWS XP®, which is available from Microsoft Corporation™. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 200 may be a stand-alone system configured to be bootable without relying on some type of network communication interfaces As a further example, data processing system 200 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 200 also may be a notebook computer or hand held computer in addition to taking the form of a PDA. Data processing system 200 also may be a kiosk or a Web appliance.

Embodiments of the present invention provide a method, apparatus, and computer instructions for maintaining service reliability in a data center. A probability of breach of a resource in the data center is determined. A breach of a resource may be the failure of the resource, the unavailability of a resource, the underperformance of a resource, or other problems with the resource. If the probability of breach exceeds a predetermined value, then additional resources are made available to the data center in order to prevent a breach of the resource from affecting the performance of the data center.

FIG. 4 is a block diagram illustrating a system for maintaining service reliability in a data center 400, in accordance with an embodiment of the present invention. Data center 400 may include any number of resources, such as servers, client computers, network connections, routers, scanners, printers, applications, or any other resource useable in a data processing environment. Servers may include data processing systems, such as server 104 in FIG. 1 or data processing system 200 in FIG. 2. Clients may include clients 108, 110, and 112 in FIG. 1 or data processing system 200 in FIG. 3. In addition, data center 400 may include a variety of resources connected over a network, such as the Internet or network 102 in FIG. 1.

In the example shown in FIG. 4, application controller 404 determines the probability of breach of a number of resources within data center 400. This step begins with application controller 404 receiving a set of metrics 402 from the managed resources within data center 400. The set of metrics may be the number of resources in the data center, the number of backup resources available to the data center, the reliability of a resource, the performance of a resource, resource utilization, response time of a resource, a user-defined quantity, and combinations thereof. Each metric within set of metrics 402 is determined by explicitly polling resources within data center 400 or by receiving data regarding events within data center 400.

Figure 5:
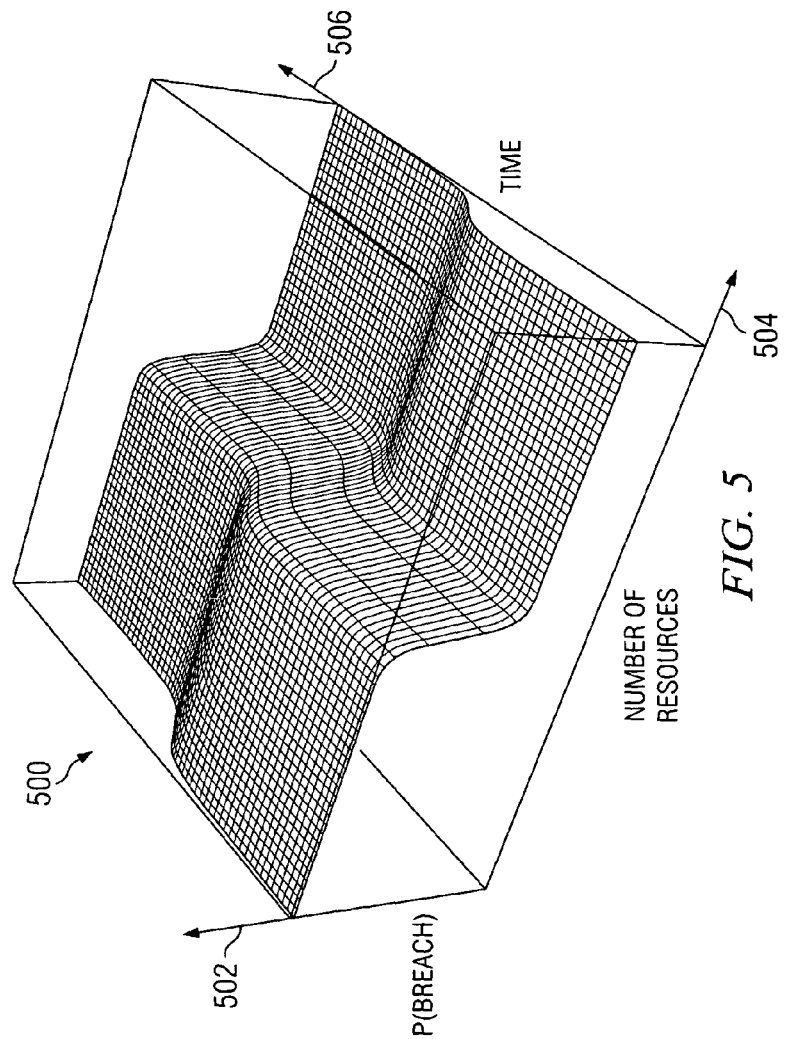
FIG. 5 is a graph showing how the probability of breach map varies with time and the number of resources, in accordance with an embodiment of the present invention.

Application controller 404 then analyzes set of metrics 402 using the application's workload model. Application controller 404 then compares the results against the service level objectives stated in the service level agreement. Based on this comparison, application controller 404 then generates probability of breach surface 406, an example of which is shown in FIG. 5 below. The probability of breach surface shows the probability of breach of resources within the data center as a function of time and the number of resources.

Global resource manager 408 accesses probability of breach surfaces 406 during its decision cycle and determines where best to allocate resources within the data center, taking into account application priority and the cost of a breach in terms of computing overhead, time, money, and other factors. Global resource manager 408 automatically generates recommendations for resource allocation and the allocation of spare resources. These recommendations are then used to invoke logical device operations 410 that cause deployment engine 412 to launch workflows. The workflows executed by deployment engine 412 results in configuration commands 414 to be formatted and sent to resources within the data center and one or more spare resource pools accordingly.

The process shown in FIG. 4 may be expanded to include multiple data centers and multiple spare resource pools. For example, a single spare resource pool maintained by a vendor may be used by many different data centers maintained by many different customers. Each data center maintains its own global resource manager. The vendor charges a fee for making spare resources available to the data center of each customer and for overhead expenses associated with maintaining the spare resource pool. The vendor may also charge a fee each time a resource is accessed by a customer. Similarly, the vendor may maintain multiple spare resource pools, each of which may be made available to one or more customers or data centers.

To assist in the resource management process, data center model 416 is used to allow resource management to be automatically calculated. Data center model 416 is a database that represents the type, configuration, and current state of every resource present in data center 400. Optionally, data center model 416 may contain information regarding resources in a separate spare resource pool. In any case, each device in data center 400 has a corresponding model in data center model 416. Data center model 416 is continuously updated, or synchronized with data center 400, in order to ensure that data center model 416 is an accurate mirror of data center 400. Because data center model 416 is an accurate model of data center 400, the database which is data center model 416 may be used to determine automatically the probability of breach map and the allocation of resources, including spare resources, within data center 400.

FIG. 5 is a graph 500 showing how the probability of breach map varies with time and the number of resources, in accordance with a preferred embodiment of the present invention. FIG. 5 shows a probability of breach surface map. The probability of breach, axis 502, increases as the number of resources, axis 504, decreases and the time passed, axis 506, increases. The probability of breach will always depend on these two major factors. Thus, the probability that at least one particular resource within a data center will breach increases as the number of resources decreases and the time passed increases. In other words, the probability of breach in a data center varies inversely with the number of resources in the data center and directly with the amount of time that passes.

The probability of breach for any one particular resource is a function of the service level agreement, and may also vary according the type of resource, the configuration of the resource, or any other user-defined or automatically defined parameter. Thus, the probability of breach of a data center, as shown in FIG. 5, may be adjusted depending on these other factors. Accordingly, although difficult to represent on a three dimensional graph, the probability of breach may vary according to more than the two factors shown in FIG. 5. The probability of breach graph may be represented by a mathematical matrix, where the probability of breach depends on values contained in the matrix.

Once the probability of breach reaches a predetermined value, the data center may be configured with additional resources to reduce the probability of breach. Most service level agreements between a customer and a resource provider specify that a probability of breach of between about 30% and about 80% within an hour is unacceptably high. A probability of breach greater than 80% within an hour is also unacceptably high.

Turning again to FIG. 4, an illustrative example is provided to demonstrate an operation of the process shown in FIG. 4. In this illustrative example, the data center has two resources, a main server and a backup server. The server supports a Web-based application. A separate spare resource pool has a number of bare metal devices that may be configured for use as servers. A global resource manager continuously monitors and manages the data center. The global resource manager uses a database, called a data center model, to manage the data center. The data center model contains information regarding the type, configuration, state, and utilization of the two servers and of the devices in the spare resource pool. In this example, the spare resource pool is maintained by a third party vendor, though one company can perform all of the examples described herein.

In the illustrative example, the global resource manager detects a failure of the main server. In order to maintain a service level agreement between the customer and the vendor, the global resource manager assigns the backup server to take over operation of the application. However, because no more backup devices remain in the data center, service reliability becomes low.

The application controller receives a set of metrics from the data center. Based on the metrics, the application controller calculates a probability of breach of the backup server. A breach occurs if the backup server becomes unable to handle the workload required of the data center, such as when the backup server fails, when the backup server becomes slow, or if the backup server is overwhelmed with work. The probability of breach is assessed for a predetermined time period. The predetermined time period may be set using any method, though in this example the predetermined time period is the time required to configure and activate a bare metal device in the spare resource pool.

Continuing the illustrative example, the application controller determines that the probability of breach of the backup server is 50% in a twenty-minute period. The service level agreement specifies that the probability of breach should not exceed 40% in a twenty-minute period. Thus, the global resource manager issues a logical device operation to a deployment engine. In turn, the deployment engine issues configuration commands to the spare device pool to configure and activate a bare metal device in the spare resource pool. Thus, the global resource manager causes a second backup server to be made available to the data center, thereby increasing the reliability of the data center.

Figure 6:
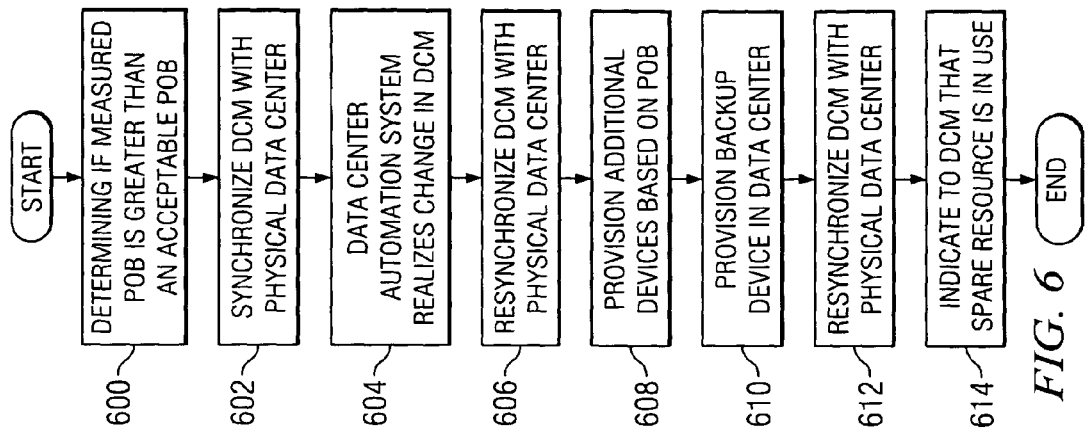
FIG. 6 is a flowchart illustrating a method of maintaining service reliability in a data center, in accordance with an embodiment of the present invention.

FIG. 6 is a flowchart illustrating a method of maintaining service reliability in a data center, in accordance with an embodiment of the present invention. FIG. 6 shows an illustrative example of a process used to perform the process shown in FIG. 4 using a data center model, such as data center model 416. FIG. 6 continues the above example of a data center having two servers, though the process may be extended to apply to any complex data center.

First, the global resource manager detects whether the probability of breach of a resource has exceeded an acceptable probability of breach (step 600). Continuing the illustrative example, because the probability of breach (50%) exceeds the service level agreement maximum probability of breach (40%), the global resource manager determines that the acceptable probability of breach has been exceeded. The object in the data center model corresponding to the backup server optionally is marked as having failed.

Next, the data center model is synchronized with the physical data center (step 602). Synchronization ensures that the data center model accurately reflects the data center. The data center automation system, of which the global resource manager is a part, then realizes a change in the data center model (step 604). Additional action may be needed to synchronize the data center model among the servers in the data center. For example, a resource reservation system may need to be notified to indicate that one of the devices has failed. Once the device is fixed, it can be made available to serve other applications. Thus, at this point, the data center model optionally may be resynchronized with the physical data center (step 606).

The physical data center is then provisioned with additional resources (step 608). The number, type, and configuration of additional resources provisioned are based on the probability of breach, the type of breach, the service level agreement, and other factors. Continuing the above example, after provisioning the new backup server, the new backup server is provisioned in the physical data center (step 610).

Thereafter, the data center model is resynchronized with the physical data center (step 612) in order to ensure that the data center model continues to mirror the physical data center. Thus, the global resource manager indicates to the data center model that the backup server is in use (step 614). The exemplary process terminates thereafter. However, the global resource manager continues to monitor the data center and the probability of breach map.

The mechanism of embodiments of the present invention have several advantages over prior art mechanisms for providing backup resources to a data center. By tying the provisioning of a backup resource to a probability of breach instead of an actual breach, the data center may continue to perform optimally even if the resource actually breaches. Thus, no service interruptions or slow-downs may occur because of a breach. Furthermore, the mechanism of embodiments of the present invention may allow a customer operating the data center to provision a minimum number of resources to ensure that the data center performs optimally. Using prior art methods, the customer may have to guess how many spare resources are needed and possibly provide more spare resources than are needed. However, by using the probability of breach to determine the number and type of spare resources that should be made available to the data center, the customer is able to more accurately determine how many spare resources should be provisioned. Thus, the mechanism of embodiments of the present invention may save the customer money and time.

It is important to note that while embodiments of the present invention have been described in the context of a fully functioning data processing system, those of ordinary skill in the art will appreciate that the processes of embodiments of the present invention are capable of being distributed in the form of a computer usable medium of instructions and a variety of forms and that embodiments of the present invention apply equally regardless of the particular type of signal bearing media actually used to carry out the distribution. Examples of computer usable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer usable media may take the form of coded formats that are decoded for actual use in a particular data processing system.

The description of embodiments of the present invention have been presented for purposes of illustration and description, and are not intended to be exhaustive or limited to embodiments of the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method of maintaining service reliability in a data center, said method comprising:
responsive to receiving a set of metrics associated with resources managed within a data center, analyzing the set of metrics using a data center model comprising model resources corresponding to resources in the data center and comparing the set of metrics against service level objectives;

determining, using the data center model, a probability of breach, wherein the probability of breach represents a probability of failure of at least one resource in the data center, wherein the probability of breach is determined using a probability of breach surface map;

responsive to determining that the probability of breach exceeds a predetermined value, synchronizing resources in the data center with model resources in the data center model to ensure the model resources in the data center model currently reflect the resources in the data center;

making an additional resource available to the data center said additional resource is adapted to perform a task performed by the at least one resource, wherein the additional resource is drawn from a spare resource pool independent of the data center, and wherein a spare resource pool is provided by a vendor;

responsive to making the additional resource available to the data center, realizing a change in the data center model using a data center automation system; and resynchronizing resources in the data center with model resources in the data center model to ensure the model resources in the data center model currently reflect the resources in the data center, wherein the probability of breach surface map is determined as a function of time and a number of resources in the data center.

2. The method of claim 1, wherein the set of metrics comprises a number of resources in the data center, a number of backup resources available to the data center, a reliability of a resource, a performance of a resource, resource utilization, response time of a resource, a user-defined quantity, or any combination thereof.

3. The method of claim 1, wherein the data center model comprises a database representing a type, configuration, and current state of each resource present in the data center.

4. The method of claim 1, wherein each resource in the data center has a corresponding model resource in the data center model.

5. A computer program product for maintaining service reliability in a data center, the computer program product comprising:

a computer usable storage medium having computer usable instructions stored thereon, the computer usable instructions for execution by a computer, comprising:

first instructions for responsive to receiving a set of metrics associated with resources managed within a data center, analyzing the set of metrics using a data center model comprising model resources corresponding to resources in the data center and comparing the set of metrics against service level objectives;

second instructions for determining, using the data center model, a probability of breach, wherein the probability of breach represents a probability of failure of at least one resource in the data center, and wherein the probability of breach is determined using a probability of breach surface map;

third instructions for responsive to determining that the probability of breach exceeds a predetermined value, synchronizing resources in the data center with model resources in the data center model to ensure the model resources in the data center model currently reflect the resources in the data center;

fourth instructions for making an additional resource available to the data center said additional resource adapted to perform a task performed by the at least one resource, wherein the additional resource is drawn from a spare resource pool independent of the data center, and wherein the spare resource pool is provided by a vendor and wherein the vendor charges a fee for making the additional resource available to the data center;

fifth instructions for realizing a change in the data center model using a data center automation system after making the additional resource available to the data center; and sixth instructions for resynchronizing resources in the data center with model resources in the data center model to ensure the model resources in the data center model currently reflect the resources in the data center, wherein the probability of breach surface map is determined as a function of time and a number of resources in the data center.

6. The computer program product of claim 5, wherein the set of metrics comprises a number of resources in the data center, a number of backup resources available to the data center, a reliability of a resource, a performance of a resource, resource utilization, response time of a resource, a user-defined quantity, or any combination thereof.

7. The computer program product of claim 5, wherein the data center model comprises a database representing a type, configuration, and current state of each resource present in the data center.

8. The computer program product of claim 5, wherein each resource in the data center has a corresponding model resource in the data center model.

9. A data processing system for maintaining service reliability in a data center, the data processing system comprising:

a bus;
a memory operably connected to the bus;
a processor operably connected to the bus;
wherein the memory contains a program set of instructions adapted to perform the steps of:

responsive to receiving a set of metrics associated with resources managed within a data center, analyzing the set of metrics using a data center model comprising model resources corresponding to resources in the data center and comparing the set of metrics against service level objectives;

determining, using the data center model, a probability of breach, wherein the probability of breach represents a probability of failure of at least one resource in the data center, wherein the probability of breach is determined using a probability of breach surface map;

responsive to determining that the probability of breach exceeds a predetermined value, synchronizing resources in the data center with model resources in the data center model to ensure the model resources in the data center model currently reflect the resources in the data center;

making an additional resource available to the data center said additional resource is adapted to perform a task performed by the at least one resource, wherein the additional resource is drawn from a spare resource pool independent of the data center, and wherein a spare resource pool is provided by a vendor;

realizing a change in the data center model using a data center automation system after making the additional resource available to the data center; and resynchronizing resources in the data center with model resources in the data center model to ensure the model resources in the data center model currently reflect the resources in the data center, wherein the probability of breach surface map is determined as a function of time and a number of resources in the data center.

10. The data processing system of claim 9, wherein the set of metrics comprises a number of resources in the data center, a number of backup resources available to the data center, a reliability of a resource, a performance of a resource, resource utilization, response time of a resource, a user-defined quantity, or any combination thereof.

11. The data processing system of claim 9, wherein the data center model comprises a database representing a type, configuration, and current state of each resource present in the data center.

12. The data processing system of claim 9, wherein each resource in the data center has a corresponding model resource in the data center model.

* * * * *